(12) United States Patent
Murakami

(10) Patent No.: US 8,010,472 B2
(45) Date of Patent: Aug. 30, 2011

(54) SYSTEM AND METHOD FOR EVALUATING INFORMATION

(75) Inventor: Tomoko Murakami, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 706 days.

(21) Appl. No.: 12/100,504

(22) Filed: Apr. 10, 2008

(65) Prior Publication Data

US 2008/0256017 A1  Oct. 16, 2008

(30) Foreign Application Priority Data

Apr. 12, 2007 (JP) ................. 2007-104804

(51) Int. Cl.
*G06F 17/00* (2006.01)
*G06N 5/00* (2006.01)
(52) U.S. Cl. .......................................... 706/45
(58) Field of Classification Search ..................... 706/45
See application file for complete search history.

(56) References Cited

U.S. PATENT DOCUMENTS

2009/0234784 A1* 9/2009 Buriano et al. ................. 706/12

OTHER PUBLICATIONS

Silberschatz et al. "On Subjective Measures of Interestingness in Knowledge Discovery", KDD-95, pp. 275-281.*
Jaroszewicz et al. "Interestingness of Frequent Itemsets Using Bayesian Networks as Background Knowledge", KDD'04, pp. 22-25.*
Hilderman et al. "Heuristics for Ranking the Interestingness of Discovered Knowledge", PAKDD-99, LNAI 1574, pp. 204-210.*
Cai-Nicolas Ziegler, et al., Improving Recommendation Lists Through Topic Diversification, Proceedings of World Wide Web Conference, pp. 22-32, 2005.

\* cited by examiner

*Primary Examiner* — Omar F Fernandez Rivas
*Assistant Examiner* — Li-Wu Chang
(74) *Attorney, Agent, or Firm* — Turocy & Watson, LLP

(57) ABSTRACT

A system includes: a preference model generating unit that generates a preference model by learning and storing the preference model for a user based on a behavior history that indicates history of behavior of the user; an evaluation list generating unit that calculates probability of a plurality of recommended candidates based on the preference model and generates an evaluation list indicating the probability of the recommended candidates; a default predicting unit that specifies habituation of the user based on the information on the behavior history and calculates a predicted default value of the plurality of recommended candidates based on the habituation; and an evaluated unexpectedness value calculating unit that calculates an evaluated unexpectedness value indicating unexpectedness where the unexpectedness is higher as a difference obtained by subtracting the predicted default value from the probability is larger.

5 Claims, 13 Drawing Sheets

FIG. 9

EXAMPLE OF VIEWING HISTORY INFORMATION

| ID | VIEWING | DATE | CHANNEL CODE | START TIME | END TIME |
|---|---|---|---|---|---|
| 276 | FALSE | 2005/1/18 | A044001 | 07:30 | 08:15 |
| 9832 | FALSE | 2005/1/18 | A044002 | 10:00 | 11:55 |
| 15259 | TRUE | 2005/1/19 | A044006 | 14:00 | 15:00 |
| ... | ... | ... | ... | ... | ... |

FIG. 10

| ID ↓ | DATE ↓ | BROADCASTER ↓ | DATE ↓ | TITLE ↓ | GUESTS ↓ |
|---|---|---|---|---|---|
| ID | date | broadcaster | genre | title | Guests |
| 15200 | 2005/7/30 | GENERAL | WESTERN MUSIC | CLASSIC COLLECTION-Chopin-(1) | /Agawa Sachiko/XYZ PHILHARMONIC ORCHESTRA |
| 24014 | 2005/7/26 | TOKYO BROAD-CASTER | WESTERN MUSIC | CLASSIC SPECIAL | /Uchida Yoko/Hasegawa Keiko |
| 15259 | 2005/7/31 | GENERAL | WESTERN MUSIC | INVITATION TO THEATER | /Agawa Sachiko/Urushibara Shinobu |
| 3746 | 2005/7/29 | EDUCATION | WESTERN MUSIC | PRAGUE INTERNATIONAL MUSIC FESTIVAL | /Agawa Sachiko/Uchida Yoko/Sato Naoko |
| 15259 | 2005/7/22 | GENERAL | COOKING | DINNER OF TODAY | Takeda Yoshiko//Agawa Sachiko/Uchida Yoko |

FIG. 11

<Network>
nodeName: PROGRAM GENRE, PREFERENCE OF GUEST, PREFERENCE OF PROGRAM DETAILS, VIEWING ← NODE IN NETWORK
rootName: PROGRAM GENRE, PREFERENCE OF GUEST, PREFERENCE OF PROGRAM DETAILS    ← ROUTE NODE IN NETWORK
<Network>

<Node>
Name: PROGRAM GENRE                              ← NAME OF NODE
Value: News, Sports, Drama, Music, Variety  } ← VALUE OF NODE
       Movie, Anime, Documentary, Hobby, Info
Parent:                                          ← NAME OF PARENT NODE
child: VIEWING                                   ← CHILD NODE
<Node>

<Node>
Name: PREFERENCE OF GUEST
Value: FAVORITE, OTHERS
Parent:
child: VIEWING
<Node>

<Node>
Name: PREFERENCE OF PROGRAM DETAILS
Value: FAVORITE, OTHERS
Parent:
child: VIEWING
<Node>

<Node>
Name: VIEWING
Value: TRUE, FALSE
Parent: PROGRAM GENRE, PREFERENCE OF GUEST, PREFERENCE OF PROGRAM DETAILS
child:
<Node>

FIG. 12

EXAMPLE OF CONDITIONAL PROBABILITY TABLE (PROGRAM GENRE = News) → 0.179326,
(PROGRAM GENRE = Sports) → 0.0307578,
(PROGRAM GENRE = Drama) → 0.0692422,
(PROGRAM GENRE = Music) → 0.0337411,
(PROGRAM GENRE = Variety) → 0.196331,
(PROGRAM GENRE = Movie) → 0.00868138,
(PROGRAM GENRE = Anime) → 0.0540274,
(PROGRAM GENRE = Documentary) → 0.0286695,
(PROGRAM GENRE = Hobby) → 0.2196

(PREFERENCE OF GUEST = FAVORITE) → 0.1,
(PREFERENCE OF GUEST = OTHERS) → 0.9, (PREFERENCE OF PROGRAM DETAILS = FAVORITE) → 0.1,
(PREFERENCE OF PROGRAM DETAILS = OTHERS) → 0.9, (PROGRAM GENRE = News & PREFERENCE OF GUEST = FAVORITE & PREFERENCE OF PROGRAM DETAILS = FAVORITE) → (VIEWING=TRUE) → 0.131579, (VIEWING=FLASE) → 0.868421
(PROGRAM GENRE = Sports & PREFERENCE OF GUEST = FAVORITE & PREFERENCE OF PROGRAM DETAILS = FAVORITE) → (VIEWING=TRUE) → 0.166667, (VIEWING=FLASE) → 0.833333
(PROGRAM GENRE = Drama & PREFERENCE OF GUEST = FAVORITE & PREFERENCE OF PROGRAM DETAILS = FAVORITE) → (VIEWING=TRUE) → 0.264706, (VIEWING=FLASE) → 0.735294
...
(PROGRAM GENRE = Variety & PREFERENCE OF GUEST = OTHERS & PREFERENCE OF PROGRAM DETAILS = OTHERS) → (VIEWING=TRUE) → 0.801654, (VIEWING=FLASE) → 0.198346
(PROGRAM GENRE = Movie & PREFERENCE OF GUEST = OTHERS & PREFERENCE OF PROGRAM DETAILS = FAVORITE) → (VIEWING=TRUE) → 0.66672, (VIEWING=FLASE) → 0.33328
(PROGRAM GENRE = Anime & PREFERENCE OF GUEST = OTHERS & PREFERENCE OF PROGRAM DETAILS = FAVORITE) → (VIEWING=TRUE) → 0.647806, (VIEWING=FLASE) → 0.358294
(PROGRAM GENRE = Documentary & PREFERENCE OF GUEST = OTHERS & PREFERENCE OF PROGRAM DETAILS = FAVORITE) → (VIEWING=TRUE) → 0.85786, (VIEWING=FLASE) → 0.1432987
(PROGRAM GENRE = Hobby & PREFERENCE OF GUEST = OTHERS & PREFERENCE OF PROGRAM DETAILS = OTHERS) → (VIEWING=TRUE) → 0.393759, (VIEWING

FIG. 13

ID, DATE, CHANNEL, BROADCASTER, START TIME, END TIME, GENRE, TITLE, GUESTS, VIEWING PROBABILITY 927, 2005/1/22, A044006, T TELEVISION, 19:00, 19:56, VIRIETY, PROGRAM A, /groupA/groupF, 0.99

1236, 2005/1/22, A044008, F TELEVISION, 12:00, 12:55, VIRIETY, PROGRAM B, /comedianA/masterD, 0.83

1987, 2005/1/22, A044008, F TELEVISION, 13:00, 14:00, VIRIETY, PROGRAM C, /actorA/actorB, actressL, 0.73

1987, 2005/1/22, A044008, F TELEVISION, 13:00, 14:00, VIRIETY, PROGRAM D, /groupH/masterC/groupW, 0.55

1987, 2005/1/22, A044008, F TELEVISION, 13:00, 14:00, VIRIETY, PROGRAM E, /actorA/actorX/groupR, 0.42

567, 2005/1/22, A044008, F TELEVISION, 18:00, 18:30, MUSIC, PROGRAM F, /masterB/musicianA/musicianB,, 0.35

234, 2005/1/22, A044010, A TELEVISION, 21:00, 22:51, DRAMA, PROGRAM G, /actorB/actressA/actressB, 0.24

FIG. 14

EXAMPLE OF DEFAULT PREDICTION RESULT

| ID | PREDICTION RESULT | DATE | CHANNEL CODE | START TIME | END TIME |
|---|---|---|---|---|---|
| 767 | 1 | 2005/3/3 | A044001 | 04:30 | 08:15 |
| 1832 | 1 | 2005/3/3 | A044008 | 11:25 | 11:55 |
| 2359 | 0 | 2005/3/3 | A044004 | 12:00 | 13:00 |
| ... | ... | ... | ... | ... | ... |

FIG. 15

EXAMPLE OF INTEREST DATA

| ID | INTEREST | DATE | CHANNEL CODE | START TIME | END TIME |
|---|---|---|---|---|---|
| 767 | FALSE | 2005/3/3 | A044001 | 04:30 | 08:15 |
| 1832 | TRUE | 2005/3/3 | A044008 | 11:25 | 11:55 |
| 2359 | TRUE | 2005/3/3 | A044004 | 12:00 | 13:00 |
| ... | ... | ... | ... | ... | ... |

FIG. 16

EXAMPLE OF EVALUATED-VALUE DATA

| ID | DATE | CHANNEL CODE | START TIME | END TIME | unexpectedness |
|---|---|---|---|---|---|
| 767 | 2005/3/3 | A044001 | 04:30 | 08:15 | 0.9 |
| 1832 | 2005/3/3 | A044008 | 11:25 | 11:55 | 0.6 |
| 2359 | 2005/3/3 | A044004 | 12:00 | 13:00 | 0.3 |
| ... | ... | ... | ... | ... | ... |

FIG. 17

RANKING, DATE, CHANNEL, BROADCASTER, START TIME, END TIME, GENRE, TITLE, GUEST

FIRST RANK, 2005/1/22, A044010, A TELEVISION, 21:00, 22:51, DRAMA, PROGRAM G, /actorB/actressA/actressB SECOND RANK, 2005/1/22, A044008, F TELEVISION, 18:00, 18:30, MUSIC, PROGRAM F, /masterB/musicianA/musicianB THIRD RANK, 2005/1/22, A044006, T TELEVISION, 19:00, 19:56, VARIETY, PROGRAM X, /groupA/groupF FOURTH RANK, 2005/1/22, A044008, F TELEVISION, 12:00, 12:55, VARIETY, PROGRAM Y, /comedianA/masterD FIFTH RANK, 2005/1/22, A044008, F TELEVISION, 13:00, 14:00, VARIETY, PROGRAM Z, /actorA/actorB/groupH

SYSTEM AND METHOD FOR EVALUATING INFORMATION

RELATED APPLICATION(S)

The present disclosure relates to the subject matter contained in Japanese Patent Application No. 2007-104804 filed on Apr. 12, 2007, which is incorporated herein by reference in its entirety.

FIELD

The present invention relates to an information evaluation system and a method for evaluating information, which can be used for evaluating various items of daily goods, such as groceries and books, broadcast contents, such as movies and music, while allowing to evaluate unexpectedness of a recommended result.

BACKGROUND

As disclosed in a related-art document [1], which is listed below, indicators such as "precision," "aveP," and "recall" described below are known as an indicator indicating performance of an information estimation system.

$$\text{precision} = \text{count}(L)/L \quad (1)$$

$$aveP = \frac{1}{R} \sum_{1 \le i \le L} isrel(s_i) \cdot \frac{\text{count}(i)}{i} \quad (2)$$

$$\text{recall} = \text{count}(L)/R \quad (3)$$

In the equations (1)-(3), L represents the number of recommended items, R represents a total number of suitable items, i represents an i-th ranked recommended item, $isrel(s_i)$ represents a degree of suitability of $s_i$ for a user's interest, and count(i) represents the number of suitable items of top i-items in the ranking.

The "precision" indicates a ratio of items (count(L)) suitable for a user's preference occupied in a recommending list. "aveP" indicates an average value of "precision" of the items (isrel(Si)) suitable for the user's preference in consideration of the ranks. The "recall" indicates a ratio of the items suitable for the user's preference to the entire suitable items (R). By using the indicators such as precision, aveP, and recall, it is possible to measure the degree of suitability of the recommended result for the user's preference.

LIST OF RELATED-ART DOCUMENTS

C. Cleverdon and M. Kean "Factors Determining the Performance of Indexing Systems" Aslib Cranfield Research Project, Cranfield England (1968) [1]
R. J. Quinlan: C4. 5: Programs for Machine Learning, Morgan Kaufmann, San Mateo, Calif. (1993) [2]
C. M. Bishop: Neural Networks for Pattern Recognition, Oxford University Press (1995) [3]
V. N. Vapnik: The Nature of Statistical Learning Theory, Springer (1995) [4]

In information estimation systems, usefulness of the information estimation system is reduced and the use thereof does not last when the recommended result is information already known to the user or when the user does not feel surprise with the recommended result. There is a need for an information estimation system that provides an unexpected recommended result that suits for the user's preference to allow the use thereof to last without damaging the user's reliability.

SUMMARY

According to a first aspect of the invention, there is provided an information evaluation system including: a preference model generating unit that generates a preference model by learning and storing the preference model for a user based on a behavior history that indicates history of behavior of the user; an evaluation list generating unit that calculates probability of a plurality of recommended candidates based on the preference model and generates an evaluation list indicating the probability of the recommended candidates; a default predicting unit that specifies habituation of the user based on the information on the behavior history and calculates a predicted default value of the plurality of recommended candidates based on the habituation; and an evaluated unexpectedness value calculating unit that calculates an evaluated unexpectedness value indicating unexpectedness where the unexpectedness is higher as a difference obtained by subtracting the predicted default value from the probability is larger.

According to a second aspect of the invention, there is provided a method for evaluating information on a recommended candidate to a user, the method including: generating a preference model by learning and storing the preference model for the user based on a behavior history that indicates history of behavior of the user; calculating probability of a plurality of recommended candidates based on the preference model; generating an evaluation list indicating the probability of the recommended candidates; specifying habituation of the user based on the information on the behavior history; calculating a predicted default value of the plurality of recommended candidates based on the habituation; and calculating an evaluated unexpectedness value indicating unexpectedness where the unexpectedness is higher as a difference obtained by subtracting the predicted default value from the probability is larger.

BRIEF DESCRIPTION OF THE DRAWINGS

In the accompanying drawings:
FIG. 9 is a table illustrating an example of a viewer's viewing history information on television program information (FIG. 10) in the information estimation system shown in FIG. 1;

FIG. 10 is a table illustrating an example of television program information in the information estimation system shown in FIG. 1;

FIG. 11 is a diagram illustrating a description example of defining a preference model structure in the information estimation system shown in FIG. 1;

FIG. 12 is a table illustrating an example of a conditional probability value of a preference model in the information estimation system shown in FIG. 1;

FIG. 13 is a table illustrating an example of an evaluation program list to be prepared in the information estimation system shown in FIG. 1;

FIG. 14 is a table illustrating an example of a default prediction result to be used in the information estimation system shown in FIG. 1;

FIG. 15 is a table illustrating an example of interest data to be used in the information estimation system shown in FIG. 1;

FIG. 16 is a table illustrating an example of an evaluated-value program database to be prepared in the information estimation system shown in FIG. 1; and FIG. 17 is a table illustrating an example of an evaluation program list to be prepared in the information to estimation system shown in FIG. 1.

DETAILED DESCRIPTION OF THE EMBODIMENTS

Hereinafter, an information evaluation system according to an embodiment of the invention will be described with reference to the drawings.

Although configurations and processes of an information evaluation system that evaluates and recommends broadcast programs to a user will be described in this embodiment, the present invention is not limited to a system that evaluates an item of broadcast programs, but can be applied to all kinds of items of daily goods, such as groceries and books, broadcast contents, such as movies and music, and the like. It is noted that the present invention is not only useful for evaluating the broadcast programs according to this embodiment but is also useful for evaluating recommended results of any information by measuring unexpectedness of the recommended results belonging to the present invention.

Figure 1:
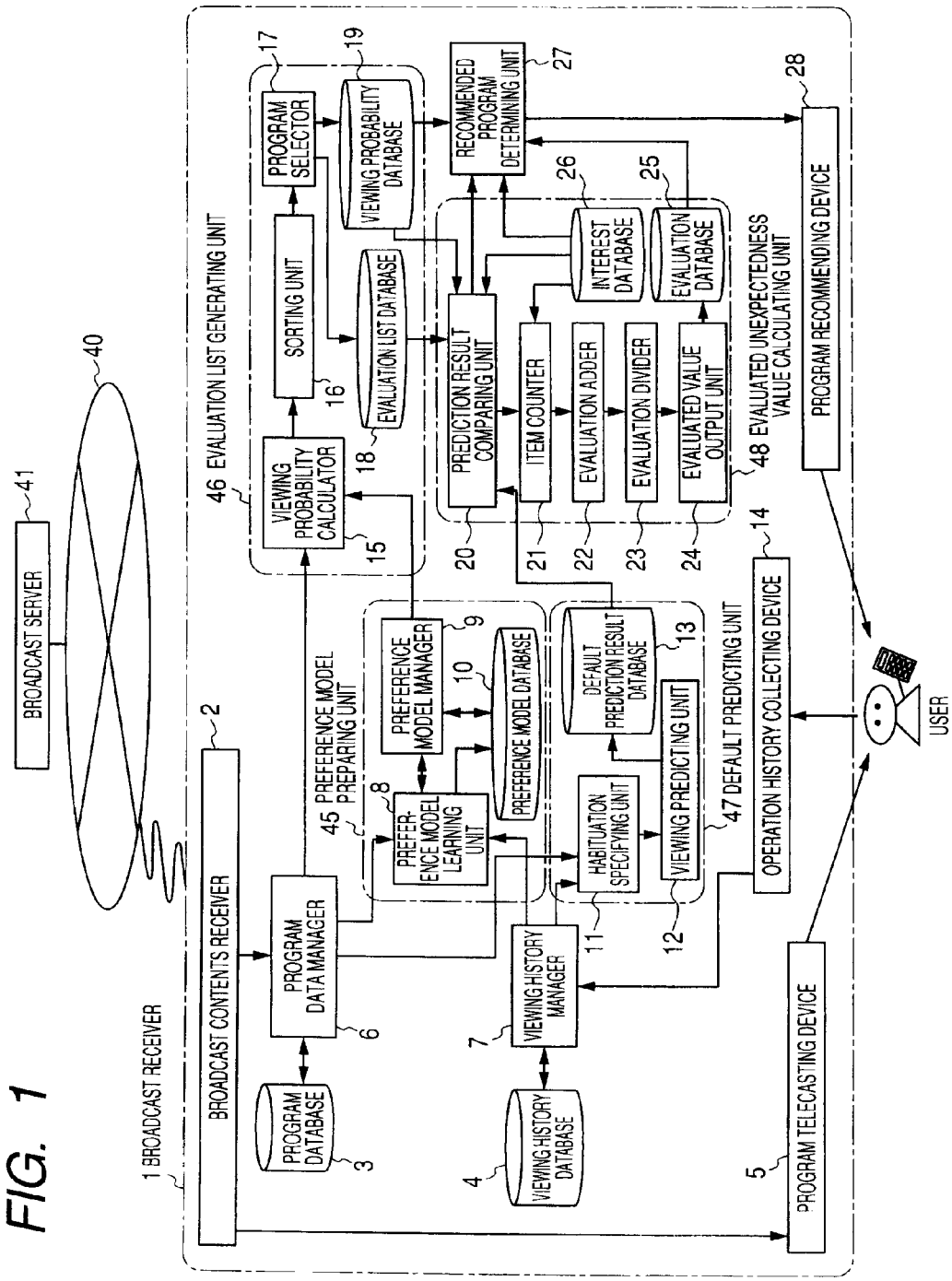
FIG. 1 is a block diagram illustrating an entire configuration of an information estimation system according to an embodiment of the present invention.
Figure 2:
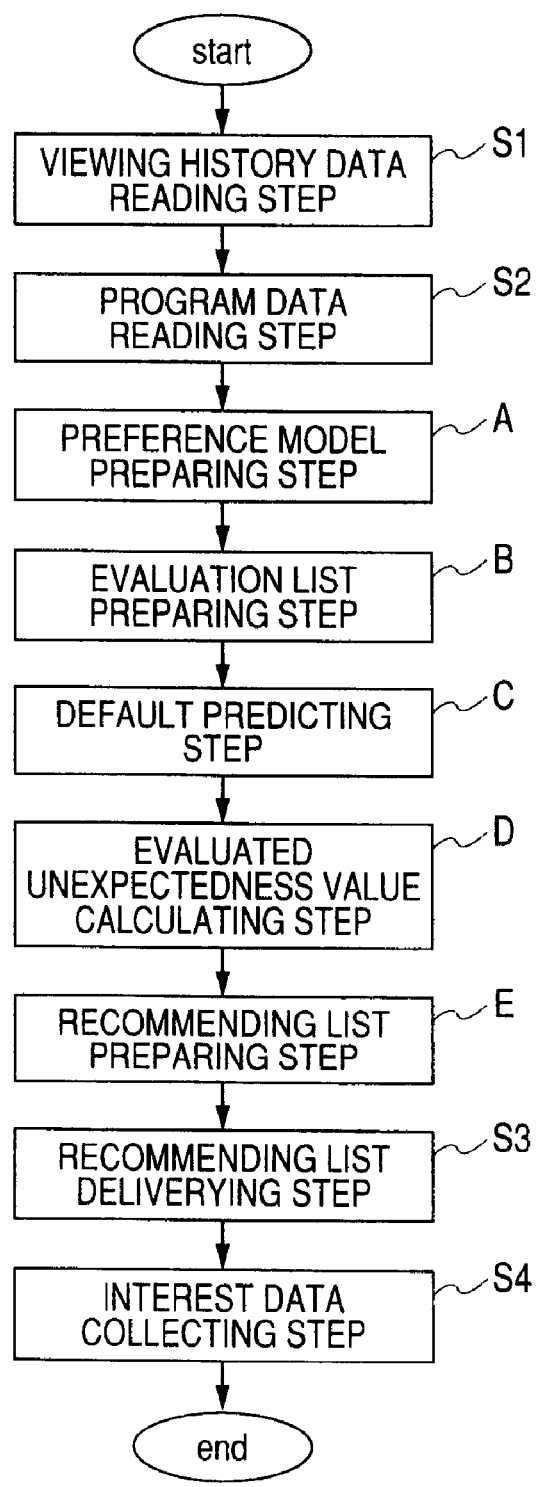
FIG. 2 is a flowchart illustrating an entire procedure of the information estimation system shown in FIG. 1.
Figure 6:
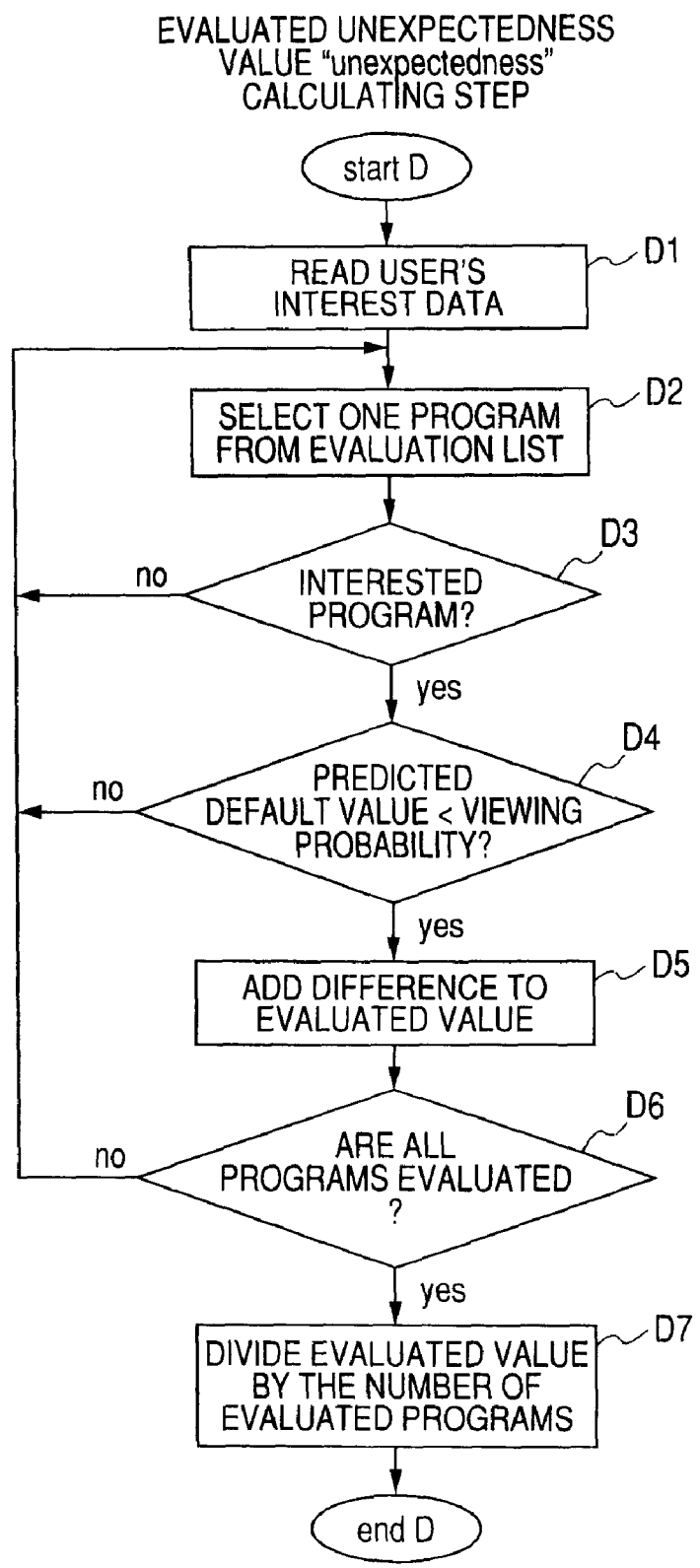
FIG. 6 is a flowchart illustrating details of an evaluated unexpectedness value (unexpectedness) calculating step (step D) of the procedure shown in FIG. 2.
Figure 7:
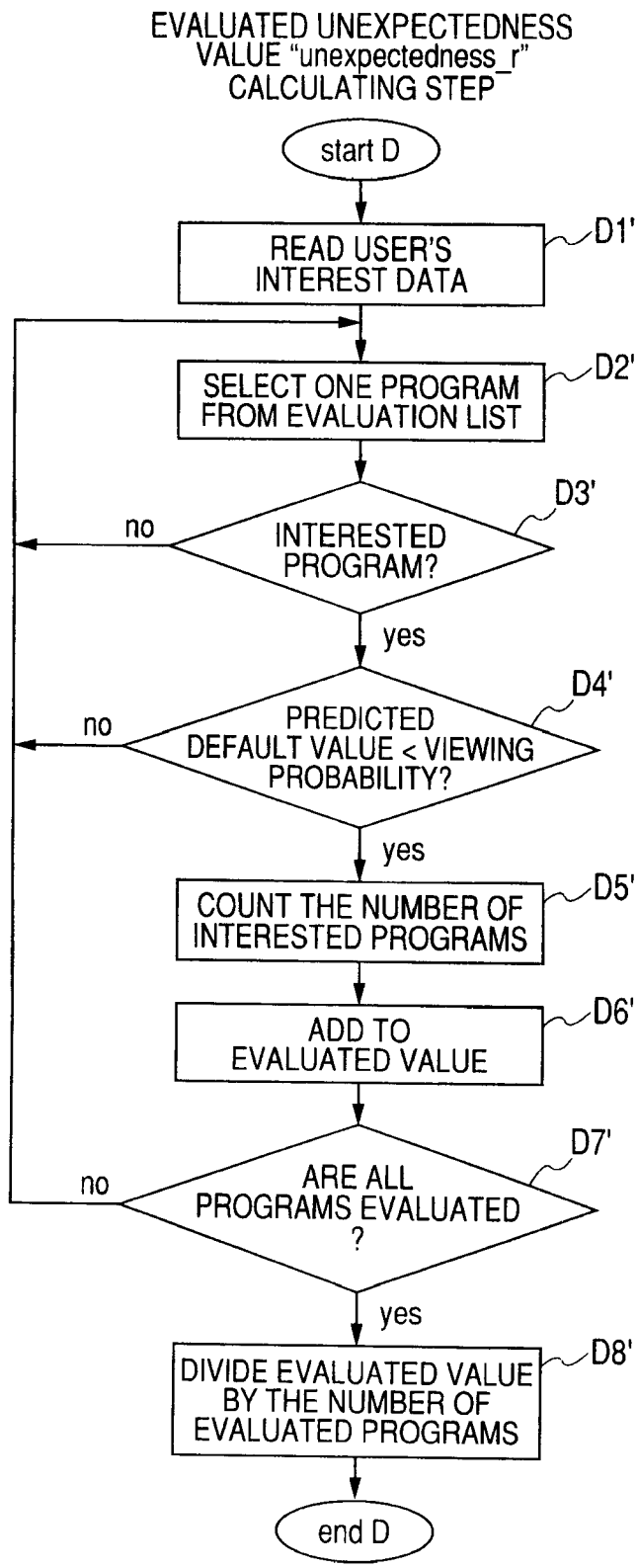
FIG. 7 is a flowchart illustrating details of an evaluated unexpectedness value (unexpectedness_r) calculating step (step D) of the procedure shown in FIG. 2.

FIG. 1 shows a configuration of the information evaluation system according to the embodiment of the present invention. FIG. 2 is a flowchart illustrating a processing procedure of the information estimation system according to the embodiment. FIGS. 3 to 5 and FIG. 8 are flowcharts illustrating details of steps A, B, C, and E shown in FIG. 2. FIGS. 6 and 7 are two types of flowcharts illustrating details of step D shown in FIG. 2.

The information estimation system according to the embodiment uses a broadcast receiver 1 for receiving and telecasting broadcast programs, an example of which is shown in FIG. 1. The broadcast receiver 1 is connected to a broadcasting server 41 through a network 40 by wired or wireless connection. A broadcast contents receiver 2 receives program contents and telecasts the program contents to users by the use of a program telecasting device 5.

The broadcast contents receiver 2 of the broadcasting terminal 1 receives program data (i.e. EPG: Electronic Program Guide). A program data manager 6 stores the received program data in a program database 3 and manages the data such as periodically updating the data. An operation history collecting device 14 collects a user's television operation history information by a remote controller or a broadcast channel changing device. A viewing history manager 7 stores the collected television operation history information in a viewing history database 4 and manages the data such as periodically updating the data. The program operation history information is collected, for example, as the data shown in FIG. 9.

FIG. 9 shows that a viewer viewed a program having a title "dinner of today" of which an attribute "viewing" is a value of "TRUE". The viewing history information is not limited to the contents shown in FIG. 9, but may be information having various formats or definitions and may be input in the form of input using a keyboard, input using a remote controller, on-line input through a network, and reading from a magnetic tape which is an information delivery medium.

The schematic processing procedure of the information estimation system is described now with reference to FIG. 2. First, a viewing history data reading step is performed (step S1) and then a program data reading step is performed (step S2). Next, a preference model preparing step (step A), an evaluation list preparing step (step B), a default predicting step (step C), a predicted unexpectedness value calculating step (step D), and a recommending list preparing step (step E) are sequentially performed. Thereafter, a recommending list arranging step (step S3) and an interest data collecting step (step S4) are performed.

The step (step A) of expressing and preparing a preference model using a Bayesian network is performed mainly by the use of a preference model generating unit 45 of the broadcast receiver 1 shown in FIG. 1. The preference model generating unit 45 includes a preference model learning unit 8, a preference model manager 9, and a preference model database 10.

Figure 3:
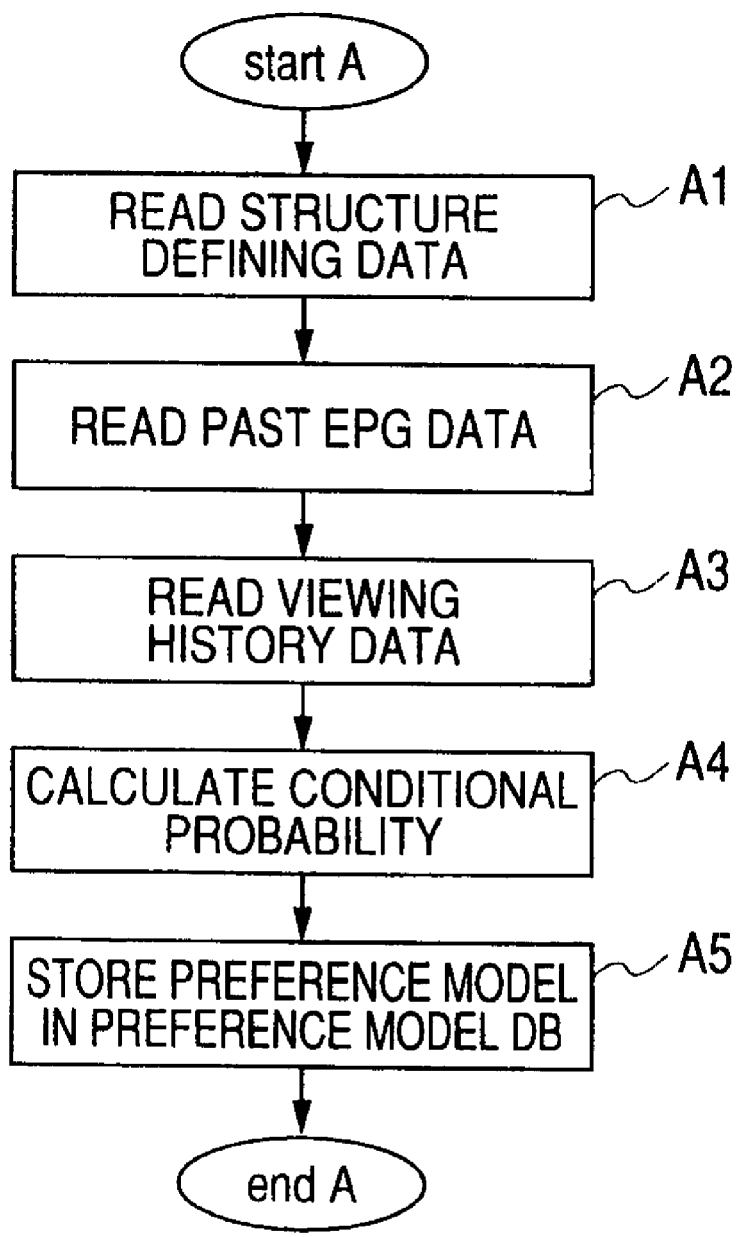
FIG. 3 is a flowchart illustrating details of a preference model preparing step (step A) of the procedure shown in FIG. 2.

The process shown in FIG. 3 is performed in the preference model preparing step A. The preference model learning unit 8 reads a structure defining data for defining a preference model structure as shown in FIG. 11 (step A1). The preference model learning unit 8 reads program information for a predetermined period in the past from a program data manager 6 as shown in FIG. 10 (step A2). The preference model learning unit 8 reads the viewing history information for a predetermined past period from a viewing history manager 7 as shown in FIG. 9 (step A3). The preference model learning unit 8 calculates a conditional probability value of probability variables in the Bayesian network as shown in FIG. 12 (step A4). The conditional probability value can be calculated as a frequency of a suitable program from the viewing history information shown in FIG. 9 or can be obtained by allowing a system designer to set a value. The data defining the obtained network structure and the conditional probability value are stored and managed as a preference model in the preference model database 10 (step A5). Although the preference model is expressed and prepared using the Bayesian network in this embodiment, the preference model may be learned using other methods such as a decision tree as described in the related-art document [2].

Figure 4:
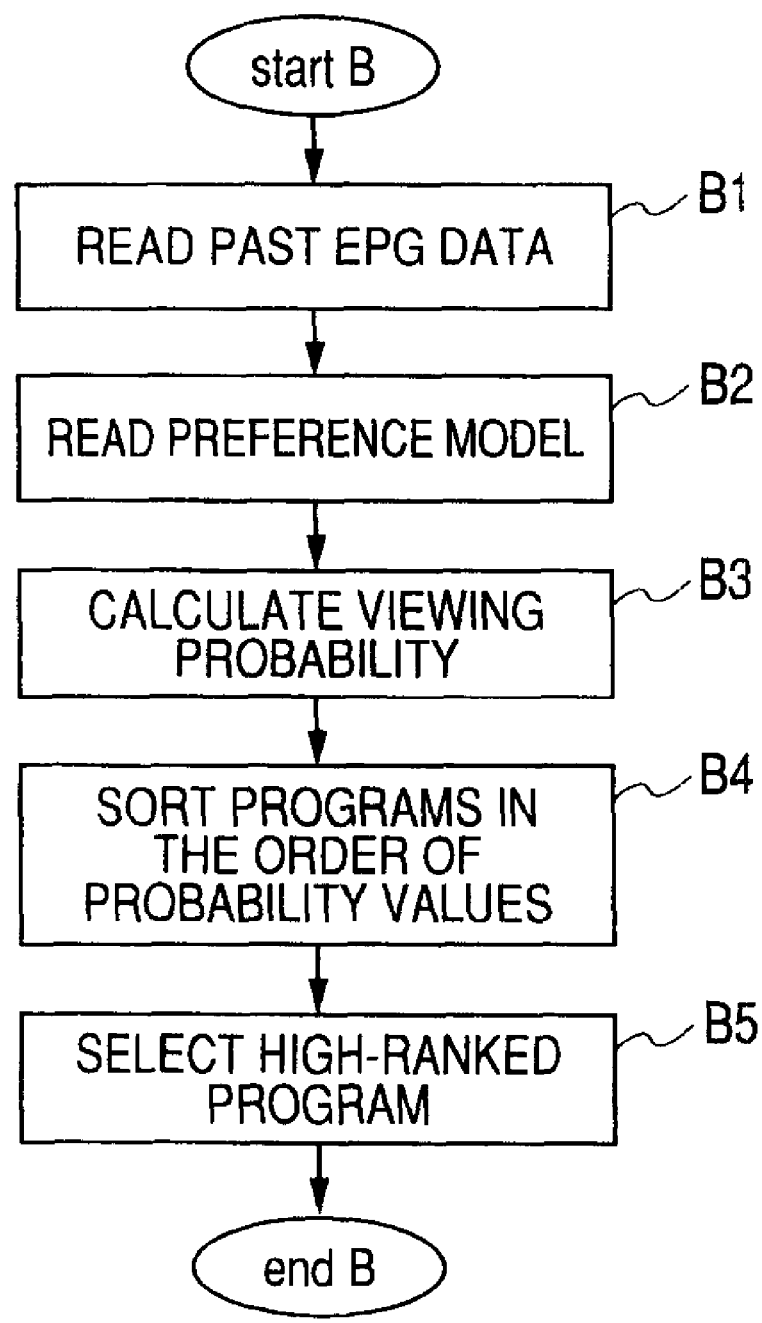
FIG. 4 is a flowchart illustrating details of an evaluation list step (step B) of the procedure shown in FIG. 2.

The evaluation list preparing step B is performed by the procedure shown in FIG. 4 by the use of an evaluation list generating unit 46. The evaluation list generating unit 46 includes a viewing probability calculating unit 15, a sorting unit 16, a program selector 17, an evaluation list database 18, and a viewing probability value database 19.

The viewing probability calculator 15 reads the program information managed by the program data manager 6 (step B1). The viewing probability calculator 15 reads the preference model managed by the preference model manager 9 (step B2). Specifically, a file defining the preference model structure shown in FIG. 11 or a file defining the conditional probability value of the probability variables shown in FIG. 12 is read by a computer. The preference model is not limited to the above-mentioned ones, but may be input in the form of input using a keyboard, or input using a remote controller, on-line input through a network, and reading from a magnetic tape as an information delivery medium.

The viewing probability calculator 15 calculates a viewing probability value of objective programs using the preference model and the program data as input information (step B3). The viewing probability value can be obtained by the probability inference using the preference model. For example, when a program genre of a television program to be broadcast in the future is "variety", a viewer's viewing probability P(viewing=TRUE|program_genre=variety) of the program is calculated using the probability distribution of conditional probability values shown in FIG. 12 by the following expression.

$$P(\text{viewing} = \text{TRUE} \mid \text{program\_genre} = \text{variety}) = \qquad (4)$$
$$P(\text{viewing} = \text{TRUE}) \cdot \frac{P(\text{program\_genre} = \text{variety} \mid \text{viewing} = \text{TRUE})}{P(\text{program\_genre} = \text{variety})}$$

The sorting unit 16 sorts the program data having a viewing probability value given thereto in a descending order of the viewing probability values (step B4). The program selector 17 stores upper X programs of the program data sorted by the sorting unit 16 as evaluated programs in the evaluation list database 18 and stores the sorted program data in the viewing probability value database 19 (step B5).

The program data having a viewing probability value given thereto which is stored in the evaluation list database 18 or the viewing probability value database 19 has the format shown in FIG. 13. Although the preference model is learned and the evaluated program is selected on the basis on the learned preference model in this embodiment, the preference model may be learned using other methods of a decision tree as described in the related-art document [2] or the evaluation program list including a user's favorite programs may be prepared by classifying the program data into a user's favorite program data and the other program data using a classifier such as a neural network as described in the related-art document [3] or an SVM as described in the related-art document [4].

Figure 5:
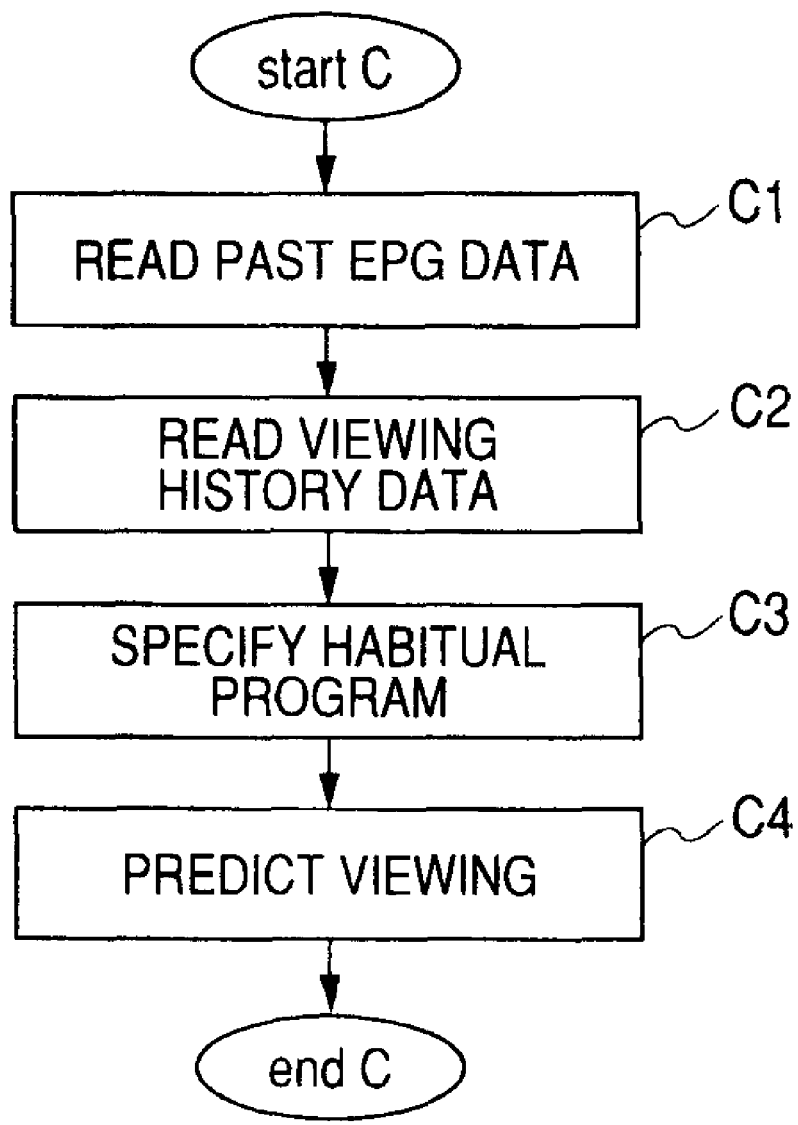
FIG. 5 is a flowchart illustrating details of a default predicting step (step C) of the procedure shown in FIG. 2.

The default predicting step C is performed by the procedure shown in FIG. 5 by the use of a default predicting unit 47. The default predicting unit 47 includes a habituation specifying unit 11, a viewing predicting unit 12, and a default prediction result database 13.

The viewing probability calculator 15 reads the program information managed by the program data manager 6 (step C1). The habituation specifying unit 11 reads the viewing history information managed by the viewing history manager 7 (step C2). The habituation specifying unit 11 specifies a program, which is habitually viewed by a viewer, based on the program data and the viewing history (step C3). In specifying the program which is habitually viewed, a program having the same title or broadcast time as the program viewed in the past can be specified as the program which is habitually viewed. The viewing predicting unit 12 predicts (default-predicts) the viewing based on the program information determined as being habitually viewed and the program information managed by the program data manager 6 (step C4).

The viewing predicting unit 12 predicts the viewing prediction result of programs as shown in FIG. 14. In FIG. 14, as the default prediction result, "1" is given to the program predicted as the viewing and "0" is given to the program not predicted as the viewing. The values are not limited to 1 and 0, but may be a decimal value of [0;1]. The viewing prediction result of the program predicted by the viewing predicting unit 12 is stored in the default prediction result database 13 (step C4).

The evaluated unexpectedness value calculating step D is performed by an evaluated unexpectedness value calculating unit 48. The evaluated unexpectedness value calculating unit 48 includes a prediction result comparing unit 20, an item counter 21, an evaluation adder 22, an evaluation divider 23, an evaluated value output unit 24, an evaluation database 25, and an interest database 26. In the evaluated unexpectedness value calculating step D, the calculation of "unexpectedness" shown in FIG. 6 and the calculation of "unexpectedness_r" show in FIG. 7 are performed.

The prediction result comparing unit 20 reads the evaluation list from the evaluation list database 18, reads the default prediction result from the default prediction result database 13, reads the interest data from the interest database 26, and the viewing probability value data from the viewing probability value database 19 (step D1 and step D1'). For example, the evaluation list is shown in FIG. 13, the interest data is shown in FIG. 15, and the default prediction result is shown in FIG. 14. As shown in FIG. 15, in the interest data, "TRUE" is given to the programs interested by a user and "FALSE" is given to the programs not interested by the user. The interest data may be collected by allowing the user to directly input the data by the use of an input device such as a keyboard or a mouse or the interest may be automatically determined using the past viewing history information and the like.

The item counter 21 selects a program (program A) from the evaluation list (step D2 and step D2') and determines whether program A is an interested program with reference to the interest database 26 (step D3 and step D3'). When it is determined that program A is the interested program, the predicted default value of program A is compared with the viewing probability value thereof (step D4 and step D4').

When the viewing probability value of program A is larger than the predicted default value, the evaluation adder 22 adds a difference between the viewing probability value and the predicted default value to the evaluated unexpectedness value "unexpectedness" (step D5). Alternatively, when the viewing probability value of program A is larger than the predicted default value, the evaluation adder 22 counts the number of items in which the interested programs are included in the programs higher than the rank of program A in the evaluation list (step D5') and adds a product of the counted value and the difference between the viewing probability value and the predicted default value to the evaluated unexpectedness value "unexpectedness_r" (step D6').

When the item counter 21 determines that program A is not the interested program and the evaluation adder 22 determines that the viewing probability value of program A is smaller than the predicted default value, the item counter 21 selects and evaluates another program from the evaluation list.

When the processes (steps D2 to D5 and steps D2' to D6') are performed on all the programs in the evaluation list (step D6 and step D7'), the evaluation divider 23 divides the resultant by the number of items in the evaluation list (step D7 and step D8'). When the processes are not performed on all the programs in the evaluation list (step D6 and step D7'), the item counter 21 selects and evaluates another program in the evaluation list. The evaluated value output unit 24 stores the calculated evaluated value in the evaluation database 25.

FIG. 16 shows an example of evaluated-value program data. The evaluated values of "unexpectedness" and "unexpectedness_r" are calculated by the following expression.

$$\text{unexpectedness} = \frac{1}{L} \sum_{1 \leq i \leq L} \max(P(s_i) - d(s_i), 0) \cdot isrel(s_i) \quad (5)$$

$$\text{unexpectedness\_r} = \frac{1}{L} \sum_{1 \leq i \leq L} \max(P(s_i) - d(s_i), 0) \cdot isrel(s_i) \cdot \frac{\text{count}(i)}{i} \quad (6)$$

In the equations (5) and (6), L represents the number of recommended items, $s_i$ represents the i-th ranked recommended item, $P(s_i)$ represents a prediction probability value of $s_i$, $d(s_i)$ represents the prediction probability value of $s_i$ by the default prediction, $isrel(s_i)$ represents a degree of suitability of $s_i$ for the user's interest, and count(i) represents the number of suitable items of top i-items in the ranking.

Figure 8:
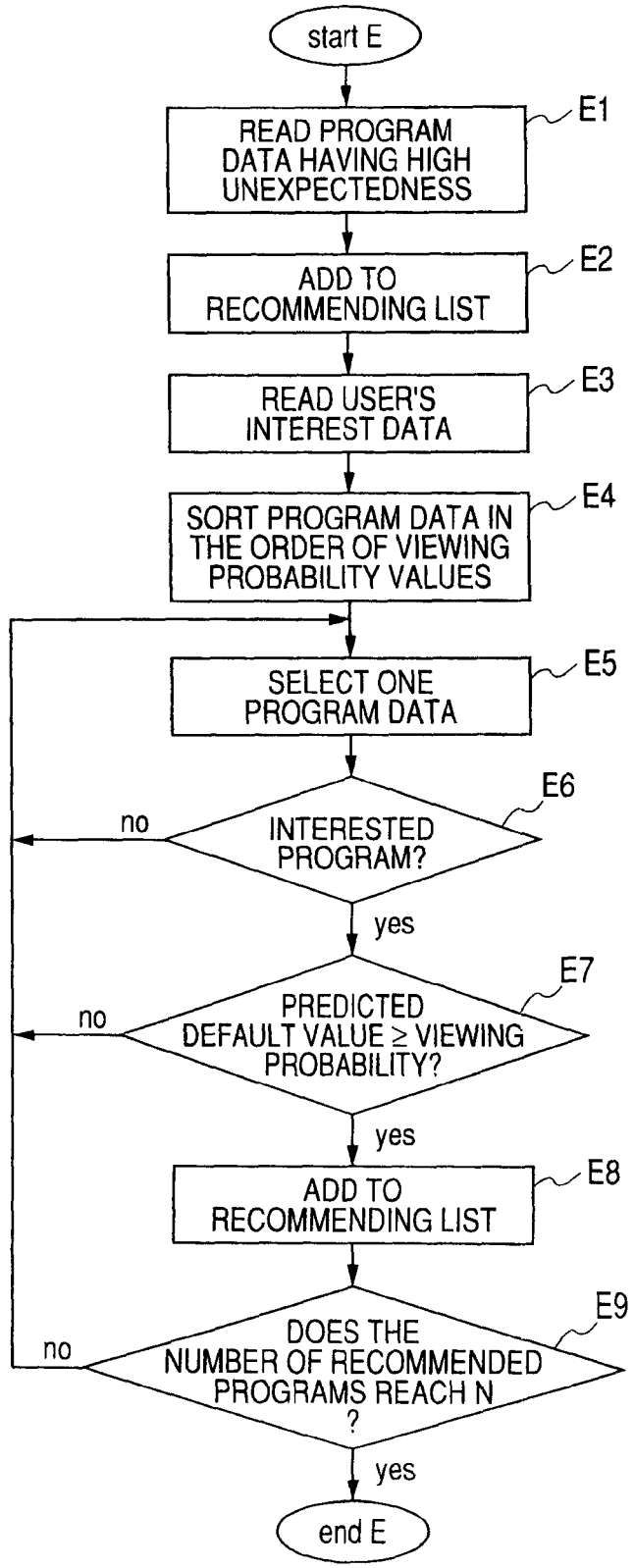
FIG. 8 is a flowchart illustrating details of a recommendation list preparing step (step E) of the procedure shown in FIG. 2.

The recommended list preparing step (step E) is performed by the procedure shown in FIG. 8 by the use of the recommended program determining unit 27. The recommended program determining unit 27 reads the evaluation data from the evaluation database 25, reads the viewing probability value data from the viewing probability value database 19 (step E1), and reads the interest data from the interest database 26 (step E3).

The recommended program determining unit 27 selects only programs of which the viewing probability value is larger than the predicted default value and adds the selected programs to the recommending list (step E2). The recommended program determining unit 27 sorts the program data in the order of viewing probability values (step E4) and selects one program (program C) having the highest viewing probability value (step E5). When program C is the interested program with reference to the interest data (step E6), the recommended program determining unit compares the predicted default value of program C with the viewing probability value (step E7). When the predicted default value is larger than the viewing probability value, recommended program determining unit adds program C to the recommending list (step E8). When program C is not the interested program or the predicted default value of program C is smaller than the viewing probability value, the recommended program determining unit selects a program having a secondly-higher viewing probability value from the viewing probability values arranged in the descending order. When the size of the recommending list reaches N, the procedure ends. When the size is less than N, the recommended program determining unit selects a program having a next-higher viewing probability value from the viewing probability values arranged in the descending order. The recommended program determining unit 27 transmits the recommending list shown in FIG. 17 to the program recommending device 28 (presentation unit) and the program recommending device 28 displays the recommending list on the broadcast receiver.

It is to be understood that the present invention is not limited to the specific embodiment described above and that the invention can be embodied with the components modified without departing from the spirit and scope of the invention. The invention can be embodied in various forms according to appropriate combinations of the components disclosed in the embodiment described above. For example, some components may be deleted from all components shown in the embodiment. Further, the components in different embodiments may be used appropriately in combination.

What is claimed is:

1. An information estimation system comprising:
 a preference model generating unit that generates a preference model by learning and storing the preference model for a user based on a behavior history that indicates history of behavior of the user, wherein the preference model is stored in a preference model database;
 an evaluation list generating unit that calculates probability of a plurality of recommended candidates based on the preference model and generates an evaluation list indicating the probability of the recommended candidates;
 a default predicting unit that specifies habituation of the user based on the information on the behavior history and calculates a predicted default value of the plurality of recommended candidates based on the habituation; and
 an evaluated unexpectedness value calculating unit that calculates an evaluated unexpectedness value indicating unexpectedness where the unexpectedness is higher as a difference is larger, the difference being obtained by subtracting the predicted default value from the probability,
 wherein the evaluated unexpectedness value calculating unit raises the priority of the recommended candidate when the recommended candidate having a relatively high evaluated unexpectedness value calculated by the evaluated unexpectedness value calculating unit is matched with the recommended candidate having the probability that is relatively high in the evaluation list prepared by the evaluation list generating unit.

2. The system according to claim 1, wherein the evaluated unexpectedness value calculating unit calculates the evaluated unexpectedness value by using the "unexpectedness" obtained by the following expression:

$$\text{unexpectedness} = \frac{1}{L} \sum_{1 \leq i \leq L} \max(P(s_i) - d(s_i), 0) \cdot isrel(s_i) \quad (1)$$

where L is the number of recommended items, $s_i$ is the i-th ranked recommended item, $P(s_i)$ is a prediction probability value of $s_i$, $d(s_i)$ is the prediction probability value of $s_i$ by the default prediction, and $isrel(s_i)$ is a degree of suitability of $s_i$ for the user's interest.

3. The system according to claim 1, wherein the evaluated unexpectedness value calculating unit calculates the evaluated unexpectedness value to raise the priority of the recommended candidate by using the "unexpectedness_r" obtained by the following expression:

$$\text{unexpectedness\_r} = \frac{1}{L} \sum_{1 \leq i \leq L} \max(P(s_i) - d(s_i), 0) \cdot isrel(s_i) \cdot \frac{\text{count}(i)}{i} \quad (2)$$

where L is the number of recommended items, $s_i$ is the i-th ranked recommended item, $P(s_i)$ is a prediction probability value of $s_i$, $d(s_i)$ is the prediction probability value of $s_i$ by the default prediction, $isrel(s_i)$ is a degree of suitability of $s_i$ for the user's interest, and count(i) is the number of suitable items of top i-items in the ranking.

4. The system according to claim 1 further comprising a presentation unit that preferentially presents the user with the recommended candidate having a high evaluated unexpectedness value among the plurality of recommended candidates.

5. A method for evaluating information on a recommended candidate to a user, the method comprising:
 generating a preference model by learning and storing the preference model for the user based on a behavior history that indicates history of behavior of the user;

calculating probability of a plurality of recommended candidates based on the preference model;
generating an evaluation list indicating the probability of the recommended candidates;
specifying habituation of the user based on the information on the behavior history;
calculating a predicted default value of the plurality of recommended candidates based on the habituation; and
calculating an evaluated unexpectedness value indicating unexpectedness where the unexpectedness is higher as a difference is larger, the difference being obtained by subtracting the predicted default value from the probability,
wherein the priority of the recommended candidate is raised when the recommended candidate having a relatively high evaluated unexpectedness value is matched with the recommended candidate having the probability that is relatively high in the evaluation list.

* * * * *